United States Patent [19]

Grant et al.

[11] Patent Number: 4,591,526
[45] Date of Patent: May 27, 1986

[54] LAMINATED PROTECTIVE JACKET FOR DISC

[75] Inventors: Paul Grant, Nabnasset; Chester Petkiewicz, Lowell, both of Mass.

[73] Assignee: Pellon Corporation, Lowell, Mass.

[21] Appl. No.: 520,025

[22] Filed: Aug. 3, 1983

Related U.S. Application Data

[62] Division of Ser. No. 313,024, Oct. 19, 1981.

[51] Int. Cl.⁴ .......................... B32B 27/00; B32B 27/14
[52] U.S. Cl. ...................................... 428/198; 428/286; 428/287; 428/296; 428/412; 428/483; 428/522
[58] Field of Search ................ 428/35, 286, 287, 412, 428/483, 198, 296, 284, 522; 206/313

[56] References Cited

FOREIGN PATENT DOCUMENTS 22076  2/1977  Japan ................................... 428/286
91400  8/1978  Japan ................................... 428/287

Primary Examiner—Lorraine T. Kendell
Attorney, Agent, or Firm—Felfe & Lynch

[57] ABSTRACT

In the formation of an envelope or jacket for a disc, comprising laminating a nonwoven fabric to a plastic sheet, superposing two such laminates with the nonwoven fabrics facing each other, and joining such superposed laminates along all edges but one, thereby to form an envelope, the improvement which comprises effecting the laminating by providing a fusible layer between the nonwoven fabric and plastic sheet and heating to soften the fusible layer while pressing to join the nonwoven fabric to the plastic. The low melting fusible layer eliminates the tendency, in its absence, to pull particles of the jacket plastic through the nonwoven liner layer where it could damage the object to be encased in the envelope. Advantageously the fusible layer is a spray spun low melting polyester which, in addition to polyvinylchloride, is bondable to polycarbonate.

5 Claims, 3 Drawing Figures

U.S. Patent  May 27, 1986  4,591,526
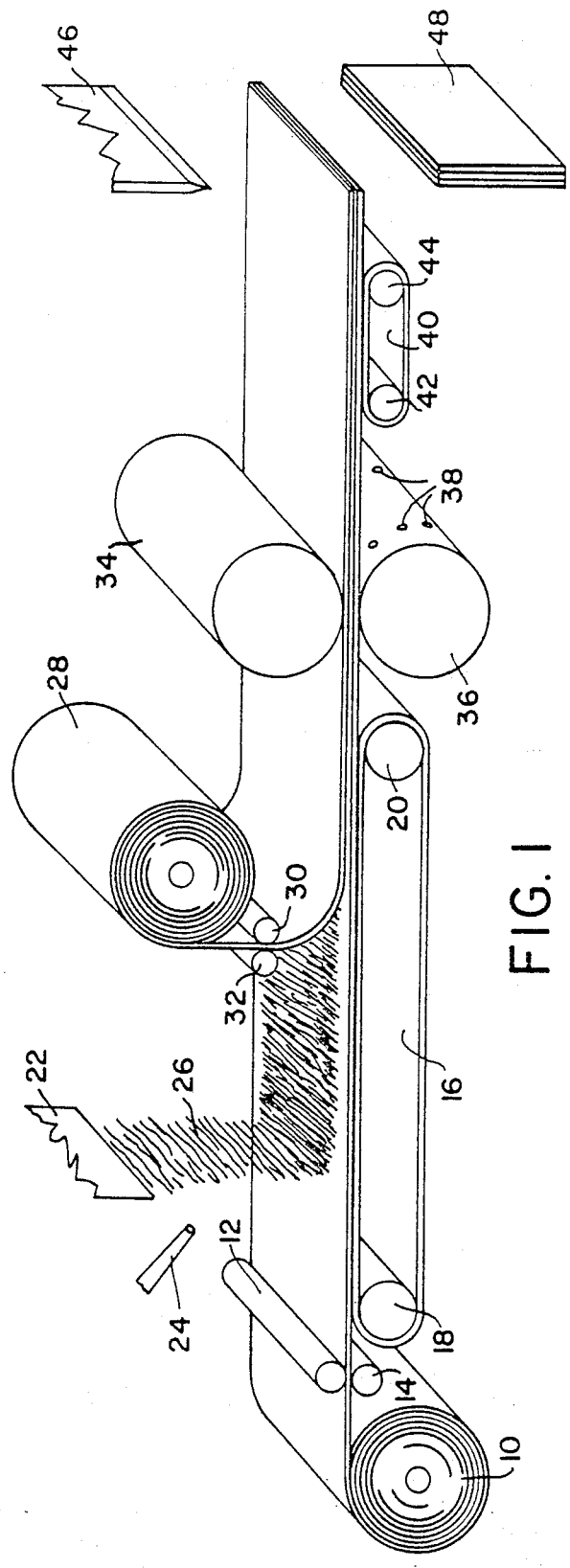
FIG. 1
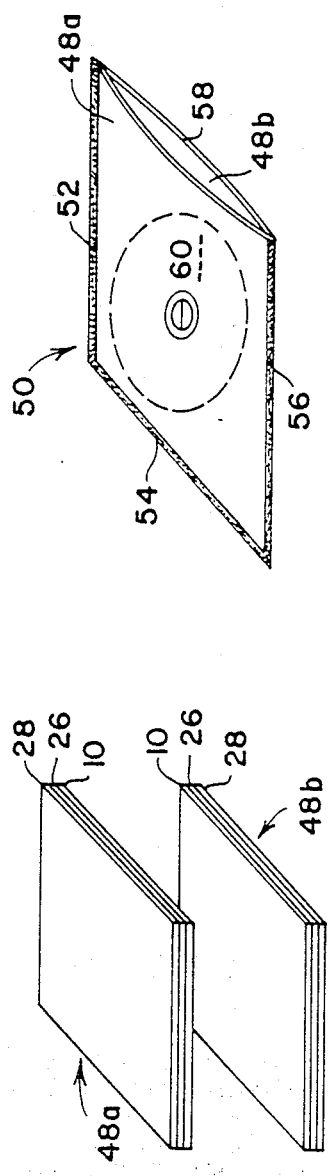
FIG. 3
FIG. 2

LAMINATED PROTECTIVE JACKET FOR DISC

This is a division, of application Ser. No. 313,024, filed Oct. 19, 1981.

The present invention relates to the construction of protective jackets for computer magnetic record discs or flexi discs, known as floppy discs, and like purposes, as well as to the preparation and use of such jackets and intermediate laminated structures therefor.

It is customary to protect discs carrying electromagnetically encoded information such as computer floppy discs and similar flat objects such as videodiscs by storage in soft-lined envelopes such as rectangular structures joined along three edges with the fourth edge initially free to permit insertion of the object being protected; for floppy discs the fourth edge may thereafter be sealed since the object need not be removed to be used.

The two layers making up the jacket are each generally a laminate with the outer layer being relatively stiff for protection and the inner layer being relatively soft so as not to scratch or otherwise damage the article being protected.

Because of their low cost, softness and high performance, nonwoven fabrics have been used for the inner liner. Plastic sheets such as polyvinyl chloride have been used as the outer layer for similar reasons of cost and performance. Usually a laminate is formed of double size, is folded over with the soft layer on the inside and two of the remaining three edges are joined to leave one open access edge. Alternatively, rectangular blanks of each layer are cut to size and bonded to one another to form a laminate and two laminates are joined to one another along three edges with the soft layers facing one another.

While such structures generally perform satisfactorily initially, eventually the floppy disc, for example, is scratched and "loses" information. This has been found to be due to the presence of fine abrasive particles on the surface of the liner. Such particles have been found to result from the manner in which the laminate is formed. This is produced by having the liner made of thermoplastic material and heating it at embossed points while in contact with the outer material. This adheres the layers to one another but oftentimes upon removing the embossed points from contact with the nonwoven layer such points pull some of the outer layer material through to the liner surface.

Other disadvantages of such system are in the process itself, e.g.
1. Excessive temperature during embossing can result in an objectionable "curl" in the polyvinyl chloride jacket.
2. An embossed pattern shows on the outside of the jacket.
3. Polycarbonate is difficult to laminate.
4. There is a limitation in processing speed which interferes with automation and continuous lamination.

It is accordingly an object of the present invention to produce laminated liners which are free of those shortcomings.

This and other objects and advantages are realized in accordance with the present invention pursuant to which the liner layer is joined to the outer plastic layer by fusing a fusible fibrous nonwoven layer positioned between the inner and outer layers, the fusible layer having a softening temperature lower than that of the inner liner layer.

The outer layer advantageously is a sheet of plastic of about 0.1 to 0.4 and preferably about 0.18 to 0.25 mm thick to impart stiffness and other qualities to the composite structure. Polyvinyl chloride has proven quite satisfactory although polycarbonate or polyester or other plastics can also be used provided that at most they only soften slightly on their insides when contacted by the softened fusible layer. Theoretically even cardboard would be suitable if production is batchwise rather than continuous so sheets rather than rolls were being employed but the composite would not be as durable. The plastic can be compounded with fillers, pigments or other ingredients for a variety of end use properties.

For the innermost layer advantageously there is used any conventional nonwoven whether made of continuous filaments or staple fibers, whether by conventional picking, carding and cross-laying or by air laying or wet laying. Even spun bond structures can be employed. The weight per square meter should be at least about 20 grams to provide enough fiber for protection. Little is gained by weights above about 60 grams per square meter since there is already enough protection and it merely makes it more difficult to fuse the fusible layer. Advantageously the weight is from about 25 to 40 grams per square meter.

Its fiber composition may vary widely. Normally melting polyester is quite satisfactory as is rayon, cotton, polypropylene, polyamide other synthetics, and blends thereof. The fibers may vary in denier but below about 25 and preferably below about 15 is preferred for softness and protection of the floppy disc with which it comes in contact. The fibers making up this layer can be bonded to one another in any conventional manner as by high temperature point or spot bonding, spraying with or immersion in adhesive dispersions followed by drying, formation by spray spinning (spun bonds), etc.

The fusible intermediate layer should range from about 3 to 30 and preferably about 5 to 10 grams per square meter and should desirably soften at a temperature at least about 20° C. and preferably at least about 50° C. lower than the nonwoven inner layer and at least about 20° C. lower than that of the outer plastic sheet. Its composition can be of any type but spun bonds of polyethylene and polypropylene are quite satsifactory as are low melting polyester or nylon polymers and/or copolymers and other thermoplastic materials. Even low melting conventional nonwovens could be used.

The fusible can be formed as a separate layer and then placed on the conventional nonwoven to serve as the liner or the preformed liner can serve as a support on which the fusible is formed, e.g. the liner layer is passed as a continuous sheet below a spinnerette extruding fusible fiber which is air whipped to deposit the fusible directly onto the liner layer.

Thereafter the liner layer is superposed on the plastic, also advantageously supplied from a roll, with the fusible therebetween and the composite is subjected to a heat bonding mechanism, e.g. passed between a pair of rolls of which at least that one contacting the liner layer is heated to effect melting of the fusible and thereby securing the layers together. Advantageously the heated roll contacting the liner layer has raised points or areas so that bonding is effected primarily at those points or areas where pressure will be particularly applied. The points or areas can be as far apart as 1 mm or even as much as 2 mm but if the unbonded spaces are too great fibers might pull loose. At the other end, bonding could be overall.

After bonding the structure can be cut into sheets of proper size and then formed into jackets by folding or stacking to place two liner layers together followed by heating or joining by other means along the edges to seal them, leaving one open edge for insertion of a disc, or a disc may be inserted and all edges sealed.

Alternatively individual blanks of plastic sheet and nonwoven liner carrying the fusible can be die cut to proper shape, stacked in proper sequence and united into a jacket, in the same manner as practiced without a fusible layer. Possibly joinder of the liner to the plastic layer through fusion of the fusible could be effected at the same time that two laminate layers are joined along their edges at higher temperature in a press but that would require high precision.

One advantage of the present invention is that it permits use of different kinds of plastic outer jackets. Heretofore only those jackets could be used which could readily be bonded directly to the liner material but polycarbonate, for example, was difficult to process because it needed higher temperatures and pressures. However, the relatively low melting fusible can bond readily to polycarbonate as well as to the high melting nonwoven so polycarbonate is now equally suitable for such jackets Further fusibles such as low melting polyesters can bond readily to polyvinyl chloride as well as polycarbonate so a sublaminate of high melting nonwoven and low melting nonwoven can be used irrespective of the outer jacket material.

With regard to the fusible layer, in place of being a nonwoven it could be made of a series of printed dots on the high melting nonwoven, it could be powder particles sprinkled on the high melting nonwoven or it could be a foam or liquid dispersion or solution applied thereto with a doctor blade or a hot melt or other method of application but a nonwoven fibrous layer and especially a spray spun layer has given excellent results with minimum add on.

The invention will be further described with reference to the accompanying drawing wherein:

FIG. 1 is a schematic perspective view of an apparatus for forming laminated sheets in accordance with the invention;

FIG. 2 is an exploded perspective view of two such sheets being superposed for joinder to form an envelope; and FIG. 3 is a perspective view of a completed envelope or jacket enclosing a disc.

Referring now more particularly to the drawing, in FIG. 1 a conventional nonwoven 10 is pulled off a bolt thereof by a pair of driven rolls 12, 14 at controlled rate and deposited on an endless belt 16 trained about two driven rolls 18, 20. A spinerette 22 extrudes low melting fiber which is blown about by air jet 24 to form a random web 26 which is deposited onto the nonwoven 10. A plastic sheet 28 from an endless roll is pulled off by rolls 30, 32 and superposed on the fusible 26. The three layer structure passes beyond belt 16 between two rolls 34, 36 of which roll 36 is heated to a temperature sufficient to soften fusible 26. Roll 36 has elevated areas 38 which apply pressure to the composite and form spot welds. The now-bonded laminate passes over belt 40 trained about rolls 42, 44 and is cut by blade 46 into blanks 48.

Alternatively the composite structure of nonwoven 10 and random web 26 can be collected and, in a separate operation at a different speed, thereafter laminated to the plastic sheet.

As shown in FIG. 2, two such blanks 48a and 48b are superposed with their nonwoven layers 10 facing one another. They can be heated to relatively high temperature along three of their edges to effect sealing, leaving one edge open.

In FIG. 3, such an envelope or jacket 50 is sealed along edges 52, 54, 56 while edge 58 is unsealed or open so that it permits insertion of a floppy disc 60.

The invention will be further described in the following illustrative example:

EXAMPLE

To a fibrous web weighing 22 grams per square meter and made up of 1.5 denier polyester staple fiber 40 mm long and softening at 200° C. there are applied 50 grams per square meter of a 10% solution containing a polyvinyl acetate binder, followed by drying. On top of the bonded nonwoven, weighing 27 grams per square meter, there is placed a spun bond polyester fibrous layer weighing 7 grams per square meter and melting between 100° and 140° C. and then a polyvinyl chloride sheet 0.25 mm thick is placed on top of the fusible layer. The three layers are passed between two rolls, the one contacting the nonwoven being heated to 170° C. and having points 0.45 mm high and 0.62 mm$^2$ in area spaced in a diamond pattern 3 mm on a side. A bonded laminate is produced. This is cut into a double blank measuring 406 mm by 203 mm which is folded with the nonwoven layers facing one another, and the two edges adjacent the folded edge are heat sealed at 190° C. There results a substantially square envelope or jacket 203 mm on a side.

It will be appreciated that the instant specification and examples are set forth by way of illustration and not limitation, and that various modifications and changes may be made without departing from the spirit and scope of the present invention.

What is claimed is:

1. A laminate comprising (a) a relatively stiff plastic outermost layer, (b) a nonwoven fibrous innermost layer weighing about 20 to 60 grams per square meter, and (c) a fused spun bond fibrous layer intermediate and joined to the innermost and outermost layers, the intermediate layer weighing about 5 to 10 grams per square meter and having a softening temperature lower than that of the innermost layer and outermost layer.

2. A laminate according to claim 1, wherein (a) comprises a polycarbonate or polyvinyl chloride sheet about 0.1 to 0.4 mm thick.

3. A laminate according to claim 1, wherein (c) has a softening temperature below about 140° C.

4. A laminate according to claim 3, wherein (c) comprises polyester fibers and fusibly joins (a) to (b) at points spaced less than about 2 mm from one another.

5. A laminate according to claim 4, wherein (a) comprises a polycarbonate or polyvinyl chloride sheet about 0.18 to 0.25 mm thick, (b) comprises a nonwoven fibrous layer weighing about 25 to 40 grams per square meter, and (c) weights about 5 to 10 grams per square meter, has a melting temperature below about 140° C. and fusibly joins (a) to (b) at points spaced less than about 1 mm from one another.

* * * * *